(12) United States Patent
Yasoshima et al.

(10) Patent No.: US 8,925,585 B2
(45) Date of Patent: Jan. 6, 2015

(54) OIL PRESSURE REGULATION VALVE (75) Inventors: Hiroshi Yasoshima, Kariya (JP); Akinori Hirano, Nagoya (JP)

(73) Assignee: Denso Corporation, Kariya (JP)

( * ) Notice: Subject to any disclaimer, the term of this patent is extended or adjusted under 35 U.S.C. 154(b) by 210 days.

(21) Appl. No.: 13/298,406

(22) Filed: Nov. 17, 2011

(65) Prior Publication Data

US 2012/0126158 A1 May 24, 2012

(30) Foreign Application Priority Data

Nov. 19, 2010 (JP) .................................. 2010-258684
Sep. 27, 2011 (JP) .................................. 2011-211388

(51) Int. Cl.
*F15B 13/044* (2006.01)
*F16K 31/06* (2006.01)
*F16H 61/02* (2006.01)

(52) U.S. Cl.
CPC ......... *F16K 31/0613* (2013.01); *F16H 61/0251* (2013.01)
USPC ............. 137/625.65; 137/596.16; 251/129.15

(58) Field of Classification Search
USPC ................... 137/625.65, 596.16; 251/129.15; 335/220
See application file for complete search history.

(56) References Cited

U.S. PATENT DOCUMENTS

| | | | |
|---|---|---|---|
| 3,880,476 A | | 4/1975 | Belart et al. |
| 4,971,116 A | * | 11/1990 | Suzuki et al. ............ 137/625.65 |
| 5,339,777 A | * | 8/1994 | Cannon ..................... 137/625.65 |
| 5,513,673 A | * | 5/1996 | Slavin et al. .............. 137/625.65 |
| 6,269,827 B1 | | 8/2001 | Potter |
| 2006/0086396 A1 | | 4/2006 | Ando |
| 2009/0032753 A1 | * | 2/2009 | Ishibashi et al. .......... 251/129.15 |

FOREIGN PATENT DOCUMENTS

| | | |
|---|---|---|
| JP | H07-055043 | 3/1995 |
| JP | P2002-310322 A | 10/2002 |
| JP | 2004-60806 | 4/2004 |
| JP | 2006-46640 | 2/2006 |

OTHER PUBLICATIONS

Office Action (3 pages) dated Apr. 8, 2013, issued in corresponding Korean Application No. 10-2011-0120206 and English translation (3 pages).
Japanese Office Action dated Nov. 27, 2012, issued in corresponding Japanese Application No. 2011-211388, with English translation.

(Continued)

*Primary Examiner* — Craig Schneider
*Assistant Examiner* — Craig J Price
(74) *Attorney, Agent, or Firm* — Nixon & Vanderhye P.C.

(57) ABSTRACT

An oil pressure regulation valve includes a spool supported in a sleeve to be slidable in an axial direction, a solenoid actuator disposed to generate an electromagnetic force for driving the spool to one axial end side, and a biasing portion configured to bias the spool to the other axial end side. The sleeve is provided with an input chamber to which an oil pressure input port is open, and an output chamber to which an oil pressure output port is open. The spool includes a land portion that is exposed to the output chamber to be biased to the one axial end side by using oil pressure in the output chamber, and the spool is movable to the one axial end side when the land portion is biased to the one axial end side by using the oil pressure in the output chamber.

2 Claims, 4 Drawing Sheets

(56) References Cited

OTHER PUBLICATIONS

Office Action (6 pages) dated Aug. 2, 2013 issued in corresponding Chinese Application No. 201110457057.0 and English translation (4 pages).

Chinese Office Action issue for Chinese Patent Application No. 201110457057.0, dated Mar. 24, 2014.
Office Action issued in Chinese Patent Application No. 201110457057.0 dated Oct. 23, 2014.

* cited by examiner

OIL PRESSURE REGULATION VALVE

CROSS REFERENCE TO RELATED APPLICATION

This application is based on Japanese Patent Applications No. 2010-258684 filed on Nov. 19, 2010, and No. 2011-211388 filed on Sep. 27, 2011, the contents of which are incorporated herein by reference in its entirety.

TECHNICAL FIELD

The present invention relates to an oil pressure regulation valve.

BACKGROUND

Conventionally, an oil pressure regulation valve is mounted to an automatic transmission device or the like for a vehicle, and is used for controlling an oil pressure to be supplied to a transmission element. The oil pressure regulation valve is provided with various ports in a sleeve, and drives a spool in the sleeve to change a communication state between an oil-pressure input port and an oil-pressure output port, thereby adjusting input oil pressure to a target pressure.

The spool is driven in an axial direction against a biasing force of the spring by an electromagnetic force of a solenoid actuator, so as to change the communication state. Furthermore, a part of output oil pressure is introduced to the sleeve from a feed back port (F/B port) provided separately from the input port and the output port, and is applied to the spool such that the communication state is changed to a shut side (e.g., JP 2006-046640A, JP 2004-060806A). Thus, the communication state can be slightly corrected by using an F/B force of the oil pressure that is input from the F/B port and is applied to the spool, so that the oil pressure can be accurately and rapidly adjusted to the target pressure.

Furthermore, the sleeve is provided with a discharge port communicating with atmosphere, in addition to the input port, the output port and the F/B port. Thus, operation oil leaking in the sleeve can be discharged to an oil tank exposed in the atmosphere, via the discharge port.

Because the sleeve is provided with the input port, the output port, the F/B port and the discharge port, the dimension of the oil pressure regulation valve is relatively long in the axial direction.

The oil pressure regulation valve described in JP 2006-046640A is a general-shut type in which the communication state is in a shutting state when electrical power is not supplied to the solenoid actuator so that an electromagnetic force is not generated in the solenoid actuator. In contrast, the oil pressure regulation valve described in JP 2004-060806A is a general-open type in which the communication state is in an open state when electrical power is not supplied to the solenoid actuator. The axial arrangement order of the input port, the output port, the F/B port and the discharge port is different from each other between the oil pressure regulation valve of the general-shut type and the oil pressure regulation valve of the general-open type.

Thus, in a valve body of an automatic transmission device in which the oil pressure regulation valve of the general-shut type and the oil pressure regulation valve of the general-open type are combined, it is necessary to make a twisting arrangement among an output oil passage, an input oil passage and a discharge oil passage.

SUMMARY

In view of the foregoing matters, it is an object of the present disclosure to shorten an axial length of an oil pressure regulation valve.

It is another object of the present disclosure to provide an oil pressure regulation valve with a new configuration.

It is further another object of the present disclosure to provide an oil pressure regulation valve with an oil passage arrangement without twisting, among an input oil passage, an output oil passage and a discharge oil passage.

According to an aspect of the present disclosure, an oil pressure regulation valve includes: a sleeve extending in an axial direction, and having an oil pressure input port and an oil pressure output port; a spool supported in the sleeve to be slidable in the axial direction; a solenoid actuator disposed to generate an electromagnetic force, which causes the spool to be driven to one axial end side when an electrical power is supplied to the solenoid actuator; and a biasing portion configured to bias the spool to the other axial end side. The sleeve is provided with an input chamber to which the oil pressure input port is open, and an output chamber to which the oil pressure output port is open. The spool is movable in the sleeve in the axial direction to change a communication state between the input chamber and the output chamber. Furthermore, the spool includes a land portion that is configured to make a communication between the input chamber and the output chamber when the spool is moved to the one axial end side by the electromagnetic force of the solenoid actuator, and to shut the communication between the input chamber and the output chamber when the spool is moved to the other axial end side by a biasing force of the biasing member. In addition, the land portion is exposed to the output chamber to be biased to the one axial end side by using oil pressure in the output chamber, and the spool is movable to the one axial end side when the land portion is biased to the one axial end side by using the oil pressure in the output chamber. Accordingly, it is unnecessary to provide an F/B port, thereby shortening the axial length in the oil pressure regulation valve.

For example, the sleeve may be provided with a discharge port for an operation oil, communicating with atmosphere, such that the operation oil leaking from the output chamber within the sleeve is discharged to the atmosphere through the discharge port. Furthermore, the input port may be provided at one end side of the output port, and the discharge port may be provided at the other end side, in the axial direction. In this case, it is possible to easily make an oil passage arrangement without twisting, among an input oil passage, an output oil passage and a discharge oil passage, even when the oil pressure regulation valve of a general-open type and an oil pressure regulation valve of a general-shut type are combined in a valve body of an automatic transmission device.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EXEMPLARY EMBODIMENT

An example structure of an oil pressure regulation valve 1 according to an embodiment will be described with reference to FIGS. 1A to 5. For example, the oil pressure regulation valve 1 is assembled to a valve body 2 of an automatic transmission device mounted to a vehicle, so as to control an oil pressure to be supplied to a transmission member (not shown).

The oil pressure regulation valve 1 includes a cylindrical sleeve 6, a spool 7, a solenoid actuator 8 and a coil spring 9. The sleeve 6 is provided with an oil pressure input port 3, an oil pressure output port 4 and an operation oil discharge port 5. The spool 7 is slidably supported in the axial direction inside of the sleeve 6. The solenoid actuator 8 generates an electromagnetic force for driving the spool 7 in one axial end side, when an electrical power is supplied to the solenoid actuator 8. The coil spring 9 is disposed as an example of a biasing portion for biasing the spool 7 always to the other axial end side.

In the oil pressure regulation valve 1, an input chamber 11 and an output chamber 12 are provided in the sleeve 6 such that the input port 3 is open in the input chamber 11 and the output port 4 is open in the output chamber 12. The spool 7 is moved in the axial direction so that a communication state between the input chamber 11 and the output chamber 12 is changed in the sleeve 6, thereby adjusting the oil pressure in the output chamber 12.

The sleeve 6 and the spool 7 are provided to configure a valve portion 13 of the oil pressure regulation valve 1, and the valve portion 13 is inserted into and assembled to an attachment hole 14 provided in the valve body 2. The valve portion 13 is inserted into the attachment hole 14 of the valve body 2 via O-rings 15 that are suitably located on the outer periphery of the sleeve 6, thereby improving a sealing performance of operation oil.

The solenoid actuator 8 includes a coil 17 that generates a magnetic flux when electrical current is supplied thereto, a plunger 18 in which the magnetic flux generated from the coil 17 passes, a stator 19 and a yoke 20. The plunger 18 is electromagnetically attracted to the one axial end side, thereby driving the spool 7 in the one axial end side via a rod 21. The solenoid actuator 8 is arranged at the other axial end side of the valve portion 13. One axial end of the yoke 20 is fastened to the other axial end of the sleeve 6, thereby integrally forming the valve portion 13.

The oil pressure regulation valve 1 is provided with a large-diameter land portion 7a. The large-diameter land portion 7a is configured to change the communication state between the input chamber 11 and the output chamber 12, thereby adjusting the oil pressure of the output chamber 12 to a target pressure. The large-diameter land portion 7a shuts the communication between the input chamber 11 and the output chamber 12 when the spool 7 is moved to the one axial end side by the electromagnetic force of the electromagnetic actuator 8. In contrast, the larger-diameter land portion 7a causes the input chamber 11 and the output chamber 12 to communicate with each other when the spool 7 is moved to the other axial end side by a biasing force (e.g., spring force) of the coil spring 9. Thus, the oil pressure regulation valve 1 is a general-open type, in which the input chamber 11 and the output chamber 12 communicate with each other when the solenoid actuator 8 is in a non-energization state. In this case, the communication state between the input chamber 11 and the output chamber 12 is in an "open state".

Figure 1A:
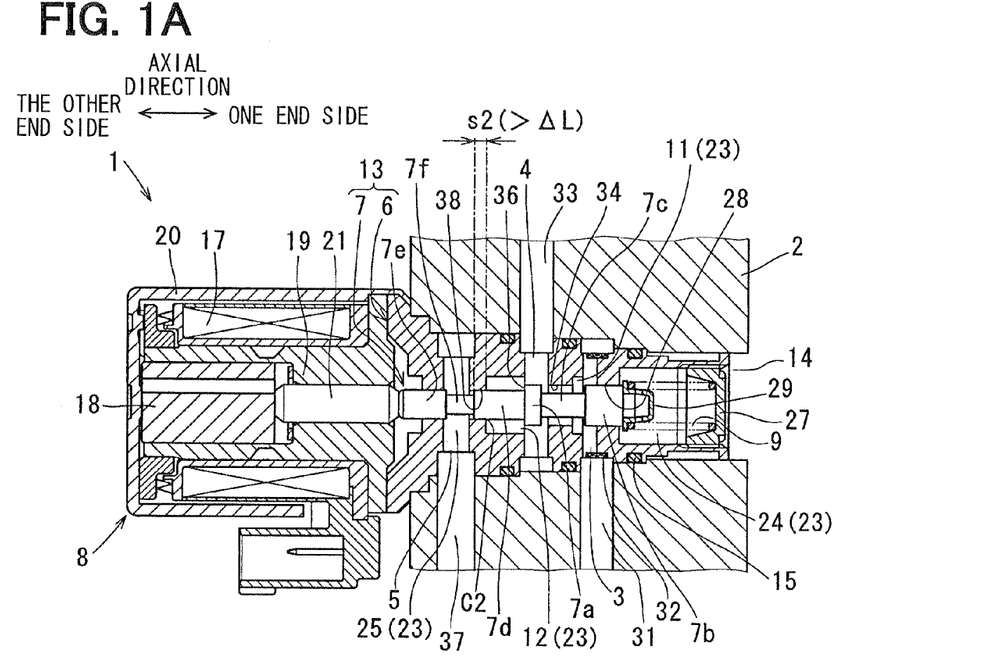
FIG. 1A is a schematic sectional view showing a state of an oil pressure regulation valve assembled into a valve body, in a high-pressure unresponsive area, according to an embodiment of the present invention.

Next, a part of structure of the oil pressure regulation valve 1 will be described in detail. As shown in FIG. 1A, a penetration hole 23 is provided in the sleeve 6 to penetrate through the sleeve 6 in the axial direction, such that the spool 7 is slidably supported and received in the through hole 23 of the sleeve 6. An inner peripheral surface of the sleeve 6, defining the through hole 23, has different radial dimensions and shapes in accordance with axial positions. Similarly, an outer peripheral surface of the spool 7 has different radial dimensions and shapes in accordance with axial positions. Therefore, the inner peripheral surface of the sleeve 6 and the outer peripheral surface of the spool 7 slide from each other or define a space such as the input chamber 11 or the output chamber 12 in which the operation oil flows. The space such as the input chamber 11 or the output chamber 12 is formed by using radial clearances between the inner peripheral surface of the sleeve 6 and the outer peripheral surface of the spool 7.

Specifically, the spool 7 includes two large-diameter land portions 7a, 7b that are slidable on the inner peripheral surface of the sleeve 6, a shaft portion 7c connecting the large-diameter land portions 7a, 7b in the axial direction, two slidable shaft portions 7d, and a shaft portion 7f connecting the slidable shaft portions 7d, 7e in the axial direction. The shaft portion 7c is connected to one end side of the large-diameter land portion 7a, and the slidable shaft portion 7d is connected to the other end side of the large-diameter land portion 7a to be slidable on the inner peripheral surface of the sleeve 6. The slidable shaft portion 7e is slidable on the inner peripheral surface of the sleeve 6 when the rod 21 contacts the slidable shaft portion 7e so that electromagnetic power of the solenoid actuator 8 is supplied to the slidable shaft portion 7e.

Figure 1B:
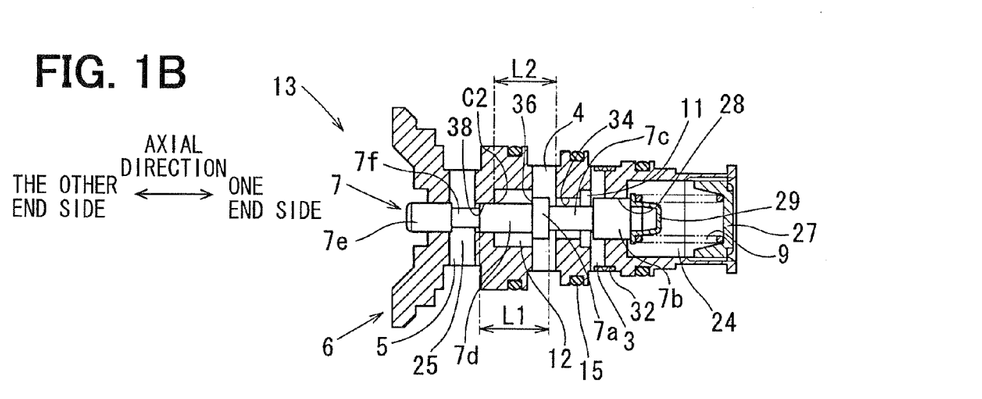
FIG. 1B is a schematic sectional view showing a valve portion of the oil pressure regulation valve according to the embodiment.
Figure 1C:
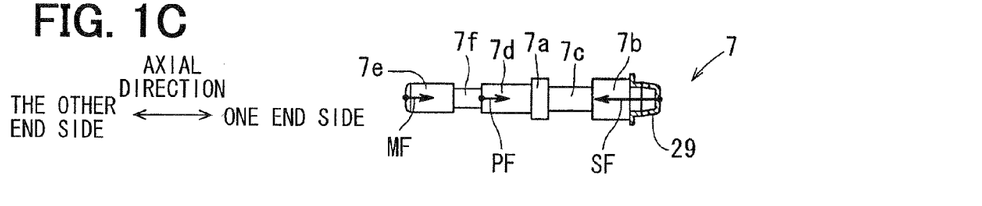
FIG. 1C is a schematic diagram showing a spool of the valve portion according to the embodiment.

As shown in FIG. 1C, the large-diameter land portions 7a, 7b, the slidable shaft portions 7d, 7c and the shaft portions 7c, 7f are arranged on the same axis. The large land portions 7a, 7b have the same diameter, the slidable shaft portions 7d, 7e have the same diameter that is smaller than the diameter of the large land portions 7a, 7b. The shaft portion 7c has a diameter smaller than the slidable shaft portions 7d, 7e, and the shaft portion 7f has a diameter smaller than the shaft portion 7c. The spool 7 is accommodated in the penetration hole 23 of the sleeve 6 such that the large-diameter land portions 7a, 7b and the sliding shaft portions 7d, 7e of the spool 7 slidably contact the inner peripheral surface of the sleeve 6. Thus, as shown in FIG. 1B, a spring chamber 24, the input chamber 11, the output chamber 12 and the discharge chamber 25 are formed in this order from the axial one end side toward the other axial end side.

The spring chamber 24 is a space in which the coil spring 9 is arranged to be extendable and contracted, and is positioned at the axial tip side of the penetration hole 23. The one axial end of the spring chamber 24 is closed by a screw adjuster 27 that supports the axial one end of the coil spring 9 and adjusts the spring force of the coil spring 9.

A slidable surface 28 is provided on an inner peripheral surface of the sleeve 6 at the other axial end side of the spring chamber 24. The slidable surface 28 has a radial dimension smaller than that of the spring chamber 24, such that the outer peripheral surface of the large-diameter land portion 7b slidably contacts the slidable surface 28. The large-diameter land portion 7b slidably contacts the slidable surface 28 of the sleeve 6 so that the other axial end side of the spring chamber 24 is closed. The other axial end of the coil spring 9 is attached to and is held in one axial end of the large-diameter land portion 7b via a spring seat 29.

The input chamber 11 is used as a space for accommodating the shaft portion 7c in the penetration hole 23, and is adapted to introduce operation oil via the input port 3. Furthermore, the input port 3 is open at a position, at which the input oil passage 31 of the valve body 2 communicates with the input chamber 11 when the sleeve 6 is inserted into an insertion hole 14 of the valve body 2.

The large-diameter land portion 7b always slidably contacts the slidable surface 28 such that the input chamber 11 is closed and sealed. The large-diameter land portion 7b protrudes into the input chamber 11 in accordance with a movement of the spool 7 toward the other axial end side, and the large-diameter land portion 7b is separated from the input chamber 11 in accordance with a movement of the spool 7 toward the one axial end side.

The operation oil to be supplied to the input chamber 11 is pressurized by an oil pressure pump to a predetermined supply pressure Ps, and is supplied to the oil pressure regulation valve 1 via the input oil passage 31. Therefore, the oil pressure of the input chamber 11 is approximately equal to the supply pressure Ps. A filter 32 is attached into the input port 3 to remove foreign material contained in the operation oil, thereby preventing the foreign materials from being introduced into the sleeve 6. The communication state of the input chamber 11 with the output chamber 12 is changed by the large-diameter land portion 7a at the other axial end side of the large-diameter land portion 7a.

The output chamber 12 is used as a space for accommodating the large-diameter land portion 7a and the slidable shaft portion 7d in the penetration hole 23, and is adapted to introduce the operation oil from the input chamber 11 and to discharge the operation oil via the oil pressure output port 4. Furthermore, the output port 4 is open at a position, in which the output oil passage 33 of the valve body 2 communicates with the output chamber 12 when the sleeve 6 is inserted into the insertion hole 14 of the valve body 2. The communication state of the output chamber 12 with the input chamber 11 is changed by the large-diameter land portion 7a at the one axial end side of the large-diameter land portion 7a.

Figure 2A:
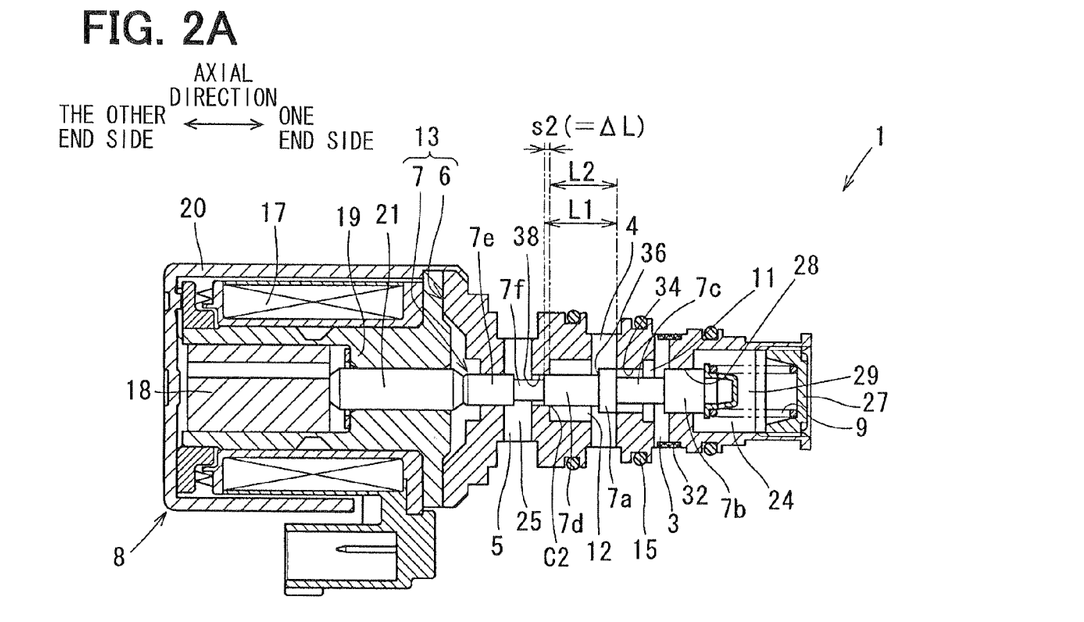
FIG. 2A is a schematic sectional view showing the oil pressure regulation valve at a high-pressure critical value.
Figure 2B:
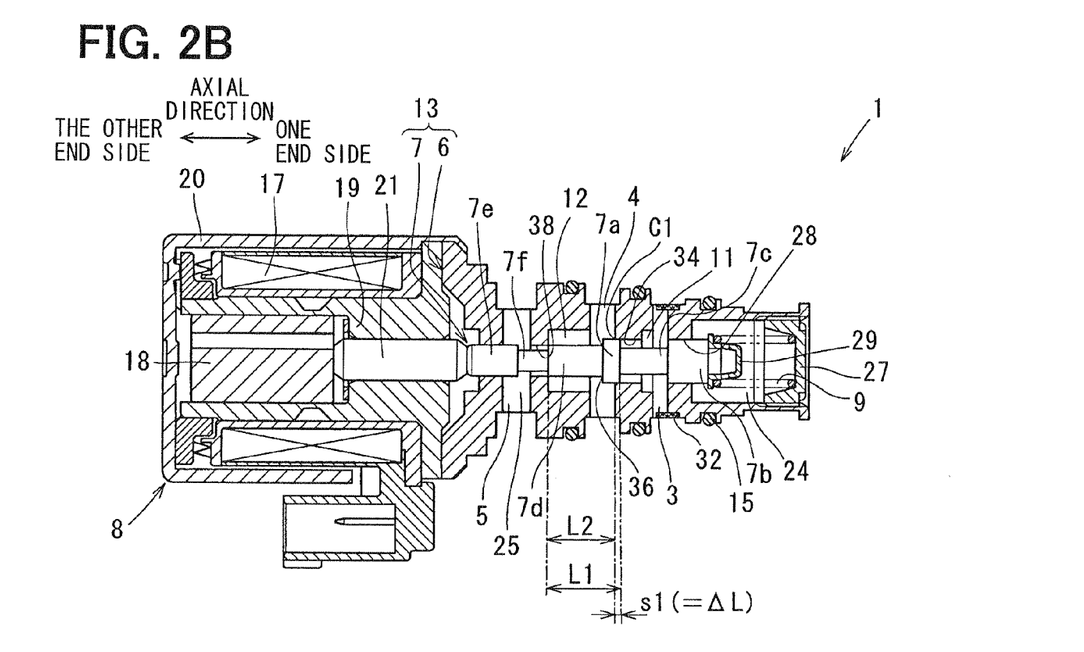
FIG. 2B is a schematic sectional view showing the oil pressure regulation valve at a low-pressure critical value.
Figure 3:
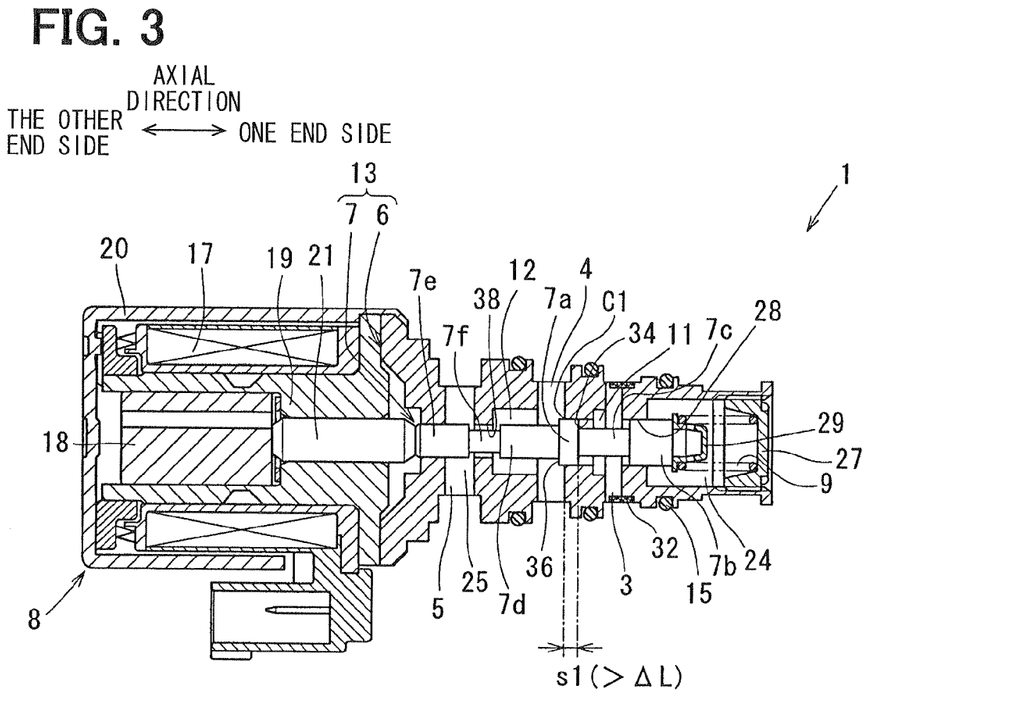
FIG. 3 is a schematic sectional view showing a state of the oil pressure regulation valve, in a low-pressure unresponsive area, according to the embodiment.

The outer peripheral surface of the large-diameter land portion 7a is slidable with respect to the slidable surface 34 that is formed at the other axial end side of the input chamber 11. The large-diameter land portion 7a slides with respect to the slidable surface 34, and is overlapped with the slidable surface 34 in the axial direction in accordance with the movement of the spool 7 toward the one axial end side. Thus, as shown in FIGS. 2B and 3, a clearance C1 is formed between the outer peripheral surface of the large-diameter land portion 7a and the slidable surface 34, in the overlapped portion. Thus, the operation oil in the input chamber 11 flows into the output chamber 12 via the clearance C1 in which the operation oil is throttled. Therefore, the oil pressure of the output chamber 12 is lower than the supply pressure Ps because the operation oil of the input chamber 11 is throttled while passing through the clearance C1.

The communication state between the input chamber 11 and the output chamber 12 is changed in accordance with an overlap length s1 of the large-diameter land portion 7a overlapped with the slidable surface 34 in the axial direction, as shown in FIGS. 2B and 3.

As the overlap length s1 becomes larger in accordance with the movement of the spool 7 toward the one axial end side, the flow resistance of the operation oil in the clearance C1 becomes larger. In this case, it is difficult for the operation oil to flow from the input chamber 11 to the output chamber 12, and hereby a pressure reduction amount ΔP1 of the oil pressure in the clearance C1 becomes larger. Thus, as the overlap length s1 becomes larger, the communication state between the input chamber 11 and the output chamber 12 is changed to the shut side.

As the overlap length s1 becomes smaller in accordance with the movement of the spool 7 toward the other axial end side, the flow resistance of the operation oil in the clearance C1 becomes smaller. In this case, it is easy for the operation oil to flow from the input chamber 11 to the output chamber 12, and thereby a pressure reduction amount ΔP1 of the oil pressure in the clearance C1 becomes smaller. Thus, as the overlap length s1 becomes smaller, the communication state between the input chamber 11 and the output chamber 12 is changed to the open side.

As shown in FIGS. 1A-1C and 2A, the output chamber 12 and the input chamber 11 communicate with each other (i.e., the communication state is the open state), when the large-diameter land portion 7a is separated from the other axial end side of the slidable surface 34 and is not overlapped with the slidable surface 34 by the movement of the spool 7 in the other axial end side. At this time, the clearance C1 is not formed and thereby a decrease of the oil pressure is not caused. Thus, the oil pressure of the output chamber 12 approximately corresponds to the oil pressure of the input chamber 11, and thereby the oil pressure of the output chamber 12 becomes equal to the supply pressure Ps.

The other end surface 36 of the large-diameter land portion 7a is always exposed to the output chamber 12 to be pressed and biased toward the one axial end side by the oil pressure of the output chamber 12. The other end surface 36 is exposed to the output chamber 12 such that the oil pressure of the output chamber 12 is always applied to the other end surface 36 toward the one axial end side. A communication state of the output chamber 12 with the discharge chamber 25 can be changed by a movement of the slidable shaft portion 7d in the axial direction.

The discharge chamber 25 is used as a space for accommodating the shaft portion 7f in the penetration hole 23 such that the operation oil flows and leaks from the output chamber 12 to the discharge chamber 25, thereby discharging the operation oil via the oil pressure discharge port 5 and the discharge oil pressure 37. The discharge port 5 is open at a position where the discharge oil passage 37 of the valve body 2 communicates with the discharge chamber 25 when the sleeve 6 is inserted into the insertion hole 14 of the valve body 2. The discharge oil passage 37 is made to communicate with the oil pan (oil tank) that is exposed to the atmosphere.

Therefore, the operation oil flowing out of the discharge port 5 returns the oil pan via the discharge oil passage 37. The pressure of the discharge chamber 25 approximately corresponds to the atmosphere PO, and thereby the operation oil leaking from the output chamber 12 to the discharge chamber 25 can be reduced to a pressure corresponding to the atmosphere PO. The discharge chamber 25 is formed to change the communication state of the one axial end side of the discharge chamber 25 with the output chamber 12 by the slidable shaft portion 7d.

The outer peripheral surface of the slidable shaft portion 7d slidably contacts the slidable surface 38 that is formed on the inner peripheral surface of the sleeve 6 at the other axial end side of the output chamber 12. The slidable shaft portion 7d slides with respect to the slidable surface 38, and is overlapped with the slidable surface 38 in the axial direction in accordance with the movement of the spool 7 toward the other axial end side. Thus, as shown in FIGS. 1A and 2A, a clearance C2 is formed between the outer peripheral surface of the slidable shaft portion 7d and the slidable surface 38, in the overlapped portion. Therefore, the operation oil of the output chamber 12 is throttled while passing through the clearance C2 so that the pressure of the operation oil is decreased, and then flows into the discharge chamber 25.

The communication state between the output chamber 12 and the discharge chamber 25 is changed in accordance with an overlap length s2 of the slidable shaft portion 7d overlapped with the slidable surface 38 in the axial direction, as shown in FIGS. 1A and 2A. As the overlap length s2 becomes larger in accordance with the movement of the spool 7 toward the other axial end side, the flow resistance of the operation oil in the clearance C2 becomes larger. In this case, it is difficult for the operation oil to flow from the output chamber 12 to the discharge chamber 25, and hereby a pressure reduction amount $\Delta P2$ of the oil pressure in the clearance C2 becomes larger. Thus, as the overlap length s2 becomes larger, the communication state between the output chamber 12 and the discharge chamber 25 is changed to the shut side.

As the overlap length s2 becomes smaller in accordance with the movement of the spool 7 toward the one axial end side, the flow resistance of the operation oil in the clearance C2 becomes smaller. In this case, it is easy for the operation oil to flow from the input chamber 11 to the discharge chamber 25, and thereby a pressure reduction amount $\Delta P2$ of the oil pressure in the clearance C2 becomes smaller. Thus, as the overlap length s2 becomes smaller, the communication state between the output chamber 12 and the discharge chamber 25 is changed to the open side.

As shown in FIGS. 2B and 3, the output chamber 12 and the discharge chamber 25 communicate with each other (i.e., the communication state is the open state) without via the clearance C2, when the slidable shaft portion 7d is separated from the one axial end side of the slidable surface 38 and is not overlapped with the slidable surface 38 by the movement of the spool 7 in the one axial end side. In this time, the clearance C2 is not formed, and thereby almost all the amount of the operation oil of the output chamber 12 returns to the oil pan via the discharge chamber 25 and the discharge oil passage 37. In this case, the output chamber 12 corresponds to the atmosphere PO similarly to the discharge chamber 25.

As shown in FIG. 1B, a first set length L1 is set larger than a second set length L2. Here, the first set length L1 is an axial distance between the one axial end of the large-diameter land portion 7a and the other axial end of the slidable shaft portion 7d, and the second set length L2 is an axial distance between the other axial end of the slidable surface 34 and the one axial end of the slidable surface 38. The difference $\Delta L$ between the first set length L1 and the second set length L2 is equal to the overlapped length s2, in a case where the one axial end of the large-diameter land portion 7a corresponds to the other axial end of the slidable surface 34, as shown in FIG. 2A. Similarly, the difference $\Delta L$ between the first set length L1 and the second set length L2 is equal to the overlapped length s1, in a case where the other axial end of the slidable shaft portion 7d corresponds to the one axial end of the slidable surface 38, as shown in FIG. 2B.

Figure 4:
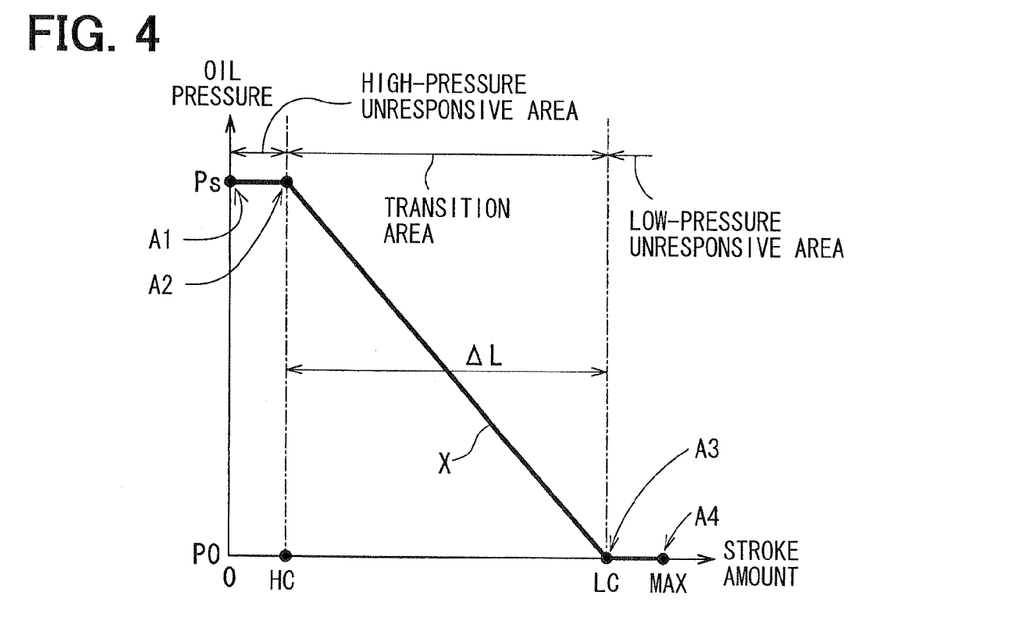
FIG. 4 is a graph showing relationships between a stroke amount and an oil pressure in an output chamber of the oil pressure regulation valve, according to the embodiment.

In the graph of FIG. 4, point A1 corresponds to FIG. 1A, point A2 corresponds to FIG. 2A, point A3 corresponds to FIG. 2B, and point A4 corresponds to FIG. 3. The difference $\Delta L$ between the first set length L1 and the second set length L2 is equal to the sum (s1+s2) of the overlapped lengths s1 and s2, in a case where both the overlapped lengths s1 and s2 are generated when the large-diameter land portion 7a slidably contacts the slidable surface 34 and when the slidable shaft portion 7d slidably contacts the slidable surface 38. That is, the difference $\Delta L$ between the first set length L1 and the second set length L2 is equal to the sum (s1+s2) of the overlapped lengths s1 and s2, when a stroke amount of the spool 7 with respect to the sleeve 6 is in a transition area shown in FIG. 4 between the point A2 corresponding to the state shown in FIG. 2A and the point A3 corresponding to the state shown in FIG. 2B.

The first and second set lengths L1, L2, the spring force and the electromagnetic force of the actuator 8 are set as follows, with respect to the pressure reduction amounts $\Delta P1$, $\Delta P2$ due to the clearance C1, C2.

That is, in a first set condition, the total ($\Delta P1+\Delta P2$) of the pressure reduction amounts $\Delta P1$, $\Delta P2$ is set to approximately correspond to a value (Ps−PO) that is the difference between the supply pressure Ps and the atmosphere PO in the transition area. Furthermore, in a second set condition, pressure reduction amounts $\Delta P1$, $\Delta P2$ are respectively set to be increased from zero to the value (Ps−PO), in proportion to an increase from the zero to the difference $\Delta L$.

Thus, the operation oil supplied to the oil pressure regulation valve 1 flows from the input chamber 11 to the output chamber 12 via the clearance C1, and thereby the oil pressure is decreased from the supply pressure Ps by the pressure reduction amount $\Delta P1$ in accordance with the overlapped length s1. The operation oil in the output chamber 12 passes through the clearance C2 and flows into the discharge chamber 25. In this case, the oil pressure is not rapidly reduced to the atmosphere but is continuously and gradually reduced by the pressure reduction amount $\Delta P2$ in accordance with the overlapped length s2 from an upstream side of the clearance C2 before flowing into the clearance C2 to a position immediately flowing into the discharge chamber 25.

When the overlapped length s1 becomes larger than the difference $\Delta L$ as shown in FIG. 3, the overlapped length s2 is not caused and the clearance C2 is not formed. In this case, as shown in FIG. 3, the output chamber 12 is open to the discharge chamber 25 without via the clearance C2. In this case, a little amount of the operation oil flows from the input chamber 11 to the output chamber 12 through the clearance C1, and thereby the little amount of the operation oil flowing to the output chamber 12 flows into the discharge chamber 25.

When the overlapped length s2 becomes larger than the difference $\Delta L$ as shown in FIG. 1A, the overlapped length s1 is not caused and the clearance C1 is not formed. In this case, as shown in FIG. 1A, the input chamber 11 is open to the output chamber 12 without via the clearance C1, and the oil pressure of the output chamber 12 is approximately equal to the supply pressure Ps. In this case, a little amount of the operation oil flows from the output chamber 12 to the discharge chamber 25 through the clearance C2.

Operation of the oil pressure regulation valve 1 according to the embodiment will be described.

As an example, a stroke amount of the spool 7 is set as follows, in the oil pressure regulation valve 1. That is, the stroke amount is zero, when electrical current is not supplied to the coil 17 of the solenoid actuator 8 and the spool 7 is biased by the spring force to the most tip position of the other axial end. In a case where the electrical current is supplied to the coil 17, the stroke amount is the axial movement amount of the spool 7 when the spool 7 moves from the most tip position of the other axial end toward the one axial end side.

FIG. 4 shows the relation characteristic X between the stoke amount and the oil pressure in the output chamber 12. As shown in FIG. 4, the relation characteristic X can be divided into three areas of a high-pressure unresponsive area, a transition area and a low-pressure unresponsive area, in accordance with the position relationship of the spool 7 with respect to the sleeve 6.

In the high-pressure unresponsive area, the oil pressure of the output chamber 12 is approximately equal to the supply pressure Ps regardless of the stroke amount. In the transition area, the oil pressure of the output chamber 12 is decreased in accordance with an increase of the stroke amount. Furthermore, in the low-pressure unresponsive area, the oil pressure of the output chamber 12 is approximately equal to the atmosphere regardless of the stroke amount. The stroke amount at the boundary between the high-pressure unresponsive area and the transition area is a high-pressure critical value HC, and the stroke amount at the boundary between the transition area and the low-pressure unresponsive area is a low-pressure critical value LC, as shown in FIG. 4.

In the high-pressure unresponsive area, the stroke amount is small, and the large-diameter land portion 7a is separated from the slidable surface 34 toward the other axial end side, as shown in FIG. 1A. In this case, the operation oil of the input chamber 11 flows into the output chamber 12 without reducing the oil pressure from the supply pressure Ps. Furthermore, in the high-pressure unresponsive area, the slidable shaft portion 7d is greatly overlapped with the slidable surface 38 to form the clearance C2, such that the overlapped length s2 is larger than the difference ΔL. Therefore, a little operation oil flows from the output chamber 12 to the discharge chamber 25 through the clearance C2. Therefore, the oil pressure in the output chamber 12 is approximately equal to the supply pressure Ps corresponding to the oil pressure in the input chamber 11.

When the stroke amount becomes equal to the high-pressure critical value HC, the one axial end of the large-diameter land portion 7a corresponds to the other axial end of the slidable surface 34, and thereby the overlapped length s2 becomes equal to the difference ΔL, as shown in FIG. 2A.

Thus, if the stroke amount slightly becomes larger than the high-pressure critical value HC, the clearance C1 is formed and the overlapped length s1 is generated. In this case, because the operation oil passes through the clearance C1, the oil pressure in the output chamber 12 becomes lower than the supply pressure Ps. Thus, if the stroke amount slightly becomes larger than the high-pressure critical value HC, the overlapped length s2 in the clearance C2 becomes smaller by the difference ΔL. In this case, because the operation oil flows into the discharge chamber 25 through the clearance C2 while being throttled in the clearance.

In the transition area, because the one axial end of the large-diameter land portion 7a is positioned at the one axial end side more than the other axial end of the slidable surface 34, the clearance C1 is formed and the overlapped length s1 is generated. In this case, the overlapped length s2 becomes smaller by the difference ΔL in the clearance C2.

Thus, the operation oil in the input chamber 11 is decompressed from the supply pressure Ps by a pressure reduction amount ΔP1 that is set in accordance with the overlapped length s1. Thus, the operation oil in the output chamber 12 is decompressed by a pressure reduction amount ΔP2 that is set in accordance with the overlapped length s2, and flows into the discharge chamber 25 in a state where the oil pressure becomes the atmosphere. The operation oil in the output chamber 12 passes through the clearance C2 and flows into the discharge chamber 25. In this case, the oil pressure is not rapidly reduced to the atmosphere PO but is continuously and gradually reduced by the pressure reduction amount ΔP2 in accordance with the overlapped length s2 from an upstream side of the clearance C2 before flowing into the clearance C2 to a position immediately flowing into the discharge chamber 25.

In the transition area, the overlapped length s1 becomes larger and the overlapped length s2 becomes smaller, in accordance with an increase of the stroke amount. Thus, the oil pressure in the output chamber 12 is linearly reduced from the supply pressure Ps to the atmosphere PO as the stroke amount increases from the high-pressure critical value HC to the low-pressure critical value LC, in accordance with the first and second set conditions.

When the stroke amount becomes equal to the low-pressure critical value LC, the other axial end of the slidable shaft portion 7d corresponds to the one axial end of the slidable surface 38, and thereby the clearance C2 is not formed and the overlapped length s1 becomes the difference ΔL in the clearance C1, as shown in FIG. 2B. Furthermore, the oil pressure in the output chamber 12 becomes equal to the atmosphere.

Thus, when the stroke amount becomes slightly larger than the low-pressure critical value LC, the slidable shaft portion 7d is separated from the one axial end of the slidable surface 38, and is not overlapped with the slidable surface 38 in the axial direction. Therefore, the output chamber 12 is open to the discharge chamber 25 without through the clearance C2, and the operation oil in the output chamber 12 flows into the discharge chamber 25 without being decompressed. Furthermore, if the stroke amount slightly becomes larger than the low-pressure critical value LC, the overlapped length s1 in the clearance C1 becomes larger by the difference ΔL. In this case, a little amount of the operation oil flows from the input chamber 11 to the output chamber 12 through the clearance C1.

The stroke amount of the spool 7 corresponds to an axial movement amount of the spool 7 in an area from the high-pressure critical value HC to the low-pressure critical value LC. Thus, the range of the stroke amount in the transition area becomes equal to the difference ΔL, as shown in FIG. 4.

In the low-pressure unresponsive area, the stroke amount becomes larger, and the clearance C1 is formed such that the large-diameter land portion 7a is largely overlapped with the slidable surface 34. Because the overlapped length s1 in the clearance C1 is larger than the difference ΔL, a little amount of operation oil flows from the input chamber 11 to the output chamber 12 through the clearance C1. Furthermore, in the low-pressure unresponsive area, the slidable shaft portion 7d is separated from the one axial end of the slidable surface 38, and thereby almost all of the amount of the operation oil of the output chamber 12 returns to the oil pan via the discharge chamber 25 and the discharge oil passage 37. In this case, the pressure in the output chamber 12 corresponds to the atmosphere PO, similarly to the discharge chamber 25.

In the oil pressure control of the oil pressure regulation valve 1, the supply pressure Ps is adjusted to be reduced to a target pressure by mainly using the relation characteristics X during the transition area. In the oil pressure control, a target value of the stroke amount is calculated based on the target pressure in accordance with the relation characteristics X.

Next, a target electrical current amount applied to the solenoid actuator 8 is calculated in accordance the target value of the stroke amount.

Then, electrical current is applied to the solenoid actuator 8 based on the calculated target electrical current, such that the solenoid actuator 8 generates an electromagnetic force corresponding to the calculated target electrical current. Thus, the spool 7 moves toward the one axial end side by the target value of the stroke amount against the spring force, using the electromagnetic force of the solenoid actuator 8. Therefore, the communication state between the input chamber 11 and the output chamber 12 is changed by the large-diameter land portion 7a, thereby adjusting the supply pressure Ps to the target pressure.

Various calculations concerning the oil pressure control are performed by an electronic control unit (ECU), such that an electrical supply to the solenoid actuator 8 is performed based on output signals outputted from the electronic control unit (ECU). The communication state between the input chamber 11 and the output chamber 12 is changed by the large-diameter land portion 7a. The large-diameter land portion 7a is biased toward the one axial end side by using the oil pressure in the output chamber 12 such that the communication state of the output chamber 12 with the input chamber 11 is changed to the shutting side.

In FIG. 1C, MF indicates the magnetic force of the solenoid actuator 8, SF indicates the spring force of the coil spring 9, and PF indicates the oil pressure in the output chamber 12. As shown in FIGS. 1A to 1C, the magnetic force MF of the solenoid actuator 8 and a biasing force due to the oil pressure PF in the output chamber 12 are applied to the spool 7 toward the one axial end side (shutting side of the communication state), and the spring force SF of the coil spring 9 is applied to the spool 7 toward the other axial end side (open side of the communication state). Accordingly, the spool 7 is moved toward the one axial end side by the target value of the stroke amount based on the resultant force (balance) of the electromagnetic force MF of the solenoid actuator 8, the oil pressure PF of the output chamber 12 and the spring force SF.

The spool 7 is disposed, such that the oil pressure in the output chamber 12 is applied to the large-diameter land portion 7a in a direction toward the one axial end side, thereby slightly adjusting the oil pressure in the output chamber 12. That is, when the communication state between the input chamber 11 and the output chamber 12 is shifted to the open side, when the oil pressure in the output chamber 12 becomes larger. In this case, the resultant force is applied to the spool 7 toward the one axial end side due to the increase of the oil pressure in the output chamber 12, because the total force (MF+PF) applied to the spool 7 becomes larger than the spring force SF applied to the spool 7. Thus, the communication state is shifted to the shutting side, thereby reducing the oil pressure in the output chamber 12.

Conversely, the communication state between the input chamber 11 and the output chamber 12 is shifted to the shutting side, when the oil pressure PF in the output chamber 12 becomes smaller. In this case, the resultant force is applied to the spool 7 toward the other axial end side due to the reduce of the oil pressure in the output chamber 12, because the total force (MF+PF) applied to the spool 7 in the one axial direction becomes smaller than the spring force SF applied to the spool 7 in the other axial direction. Thus, the communication state is shifted to the open side, thereby increasing the oil pressure in the output chamber 12. The spool 7 is disposed, such that the oil pressure in the output chamber 12 is fed-back to the large-diameter land portion 7a, thereby slightly adjusting the oil pressure in the output chamber 12 to the target value.

According to the oil pressure regulation valve 1 of the present embodiment, the spool 7 includes the large-diameter land portion 7a that is arranged in the sleeve 6 to make communication between the input chamber 11 and the output chamber 12 and to shut the communication therebetween. The large-diameter land portion 7a shuts the communication between the input chamber 11 and the output chamber 12 when the spool 7 is moved toward the one axial end side by the electromagnetic force of the solenoid actuator 8. In contrast, the input chamber 11 and the output chamber 12 communicate with each other when the spool 7 is moved toward the other axial end side by the spring force. Furthermore, the large-diameter land portion 7a is exposed to the output chamber 12 to be biased toward the one axial end side by the oil pressure in the output chamber 12. The large-diameter land portion 7a is biased toward the one axial end side by the oil pressure in the output chamber 12 to cause the spool 7 to be movable toward the one axial end side.

Thus, in the oil pressure regulation valve 1 of the general-open type, because the oil pressure in the output chamber 12 is applied to the spool 7 so as to shift the communication state between the input chamber 11 and the output chamber 12 to the shutting side, the communication state therebetween can be slightly adjusted by the oil pressure in the output chamber 12. Therefore, in the oil pressure regulation valve 1 of the general-open type, even when the oil pressure applied from the output port 4 to the outside of the sleeve 6 is not introduced into the sleeve 6, the communication state can be slightly adjusted, and thereby it is unnecessary to provide a F/B port. Thus, the axial length can be shortened in the oil pressure regulation valve 1 of the general-open type.

Figure 5:
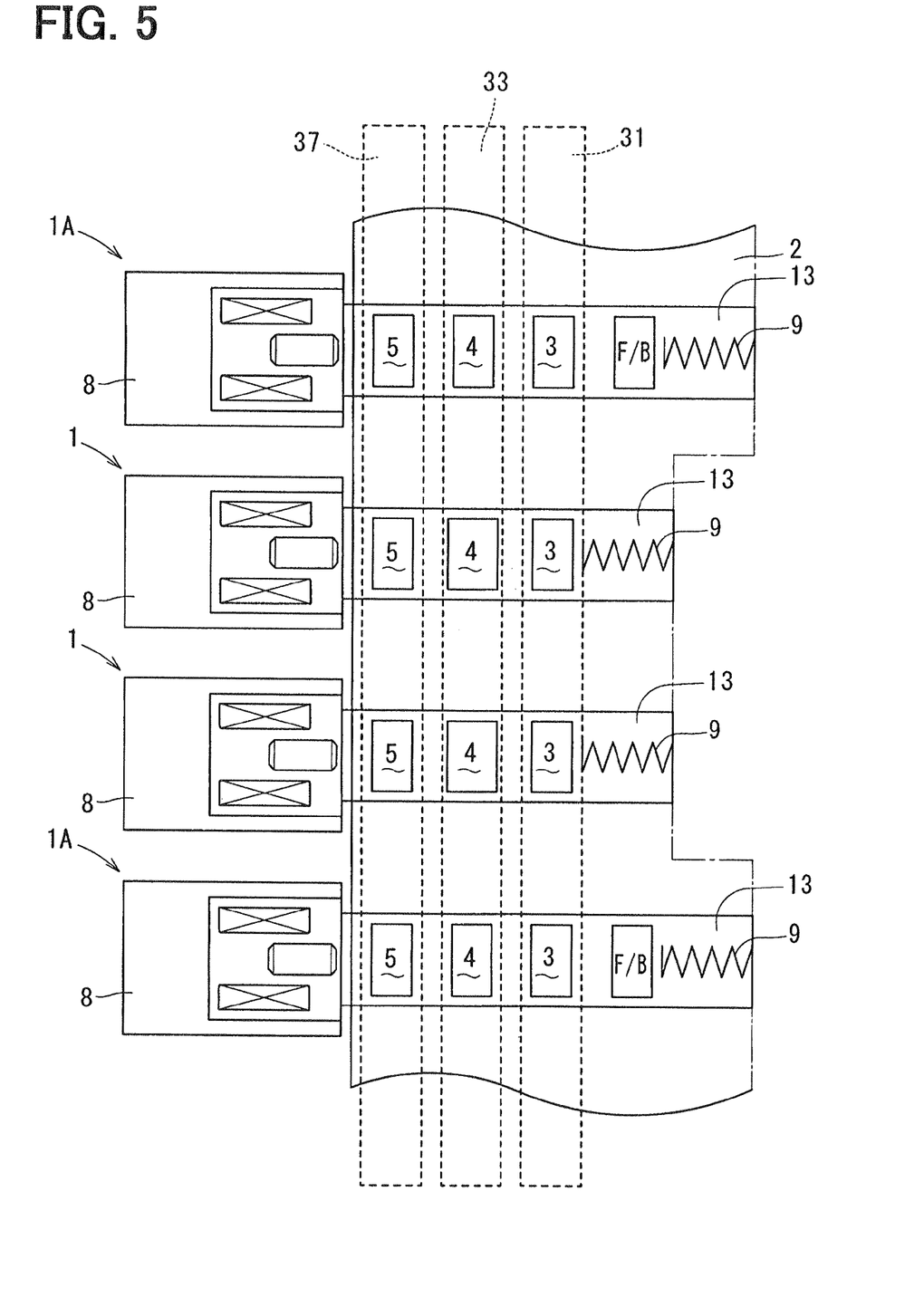
FIG. 5 is a schematic diagram for explaining arrangement positions of an oil-pressure input port, an oil-pressure output port and an oil discharge port, in oil pressure regulation valves of general-shut type and general-open type.

In the oil pressure regulation valve 1 of the general-open type, the input port 3, the output port 4 and the discharge port 5 are arranged in this order from the one axial end toward the other axial end. In FIG. 5, for example, an oil pressure regulation valve 1A on the top side is a general-shut type in which the F/B port, the input port 3, the output port 4 and the discharge port 5 are arranged in this order from the one axial end side to the other axial end side, and an oil pressure regulation valve 1A on the bottom side is a general-open type in which the F/B port, the input port 3, the output port 4 and the discharge port 5 are arranged in this order from the one axial end side to the other axial end side. One of the oil pressure regulation valves 1 of the general-shut type and the other one of the oil pressure regulation valves 1 of the general-open type are positioned between the oil pressure regulation valves 1A. As shown in FIG. 5, in the oil pressure regulation valve 1 of the general-shut type or in the oil pressure regulation valve 1 of the general-open type, the arrangement positions of the input port 3, the output port 4 and the discharge port 5 respectively correspond to those of the oil pressure regulation valve 1A of the general-shut type or in the oil pressure regulation valve 1A of the general-open type. Thus, in the valve body 2 of the automatic transmission device, it is unnecessary to turn the arrangement of the oil passages 31, 33, 37.

The structure of the oil pressure regulation valve 1 is not limited to the above-described examples. For example, the configuration for making communication between the input chamber 11 and the output chamber 12 in the sleeve 6, the configuration for applying the oil pressure in the output chamber 12 to the spool 7, and the like may be suitably changed.

Although the present invention has been fully described in connection with the above embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An oil pressure regulation valve comprising:
    a sleeve extending in an axial direction, and having an oil pressure input port and an oil pressure output port;
    a spool supported in the sleeve to be slidable in the axial direction;
    a solenoid actuator disposed to generate an electromagnetic force, which causes the spool to be driven to a first end side, when an electrical power is supplied to the solenoid actuator; and
    a biasing portion configured to bias the spool to a second end side opposite to the first end side in the axial direction, wherein
    the sleeve is provided with an input chamber to which the oil pressure input port is open, and an output chamber to which the oil pressure output port is open,
    the input chamber and the output chamber are respectively defined by spaces between the sleeve and the spool disposed in the sleeve,
    the spool is movable in the sleeve in the axial direction,
    the spool includes a land portion that is configured to shut a communication between the input chamber and the output chamber when the spool is moved to the first end side by the electromagnetic force of the solenoid actuator, and to make the communication between the input chamber and the output chamber when the spool is moved to the second end side by a biasing force of the biasing portion,
    the land portion is exposed to the output chamber to change a communication state between the input chamber and the output chamber, and to be biased to the first end side by using oil pressure in the output chamber,
    the spool is movable to the first end side when the land portion is biased to the first end side by using the oil pressure in the output chamber,
    the land portion has a first end portion on the first end side, which changes a communication state between the input chamber and the output chamber based on a position relationship with a slidable surface of the sleeve, and a second end portion exposed to the output chamber to be biased to the first end side by using oil pressure in the output chamber.

2. The oil pressure regulation valve according to claim 1, wherein
    the sleeve is provided with a discharge port of an operation oil, communicating with atmosphere, such that the operation oil leaking from the output chamber within the sleeve is discharged to the atmosphere through the discharge port, and
    the input port is provided at the first end side, and the discharge port is provided at the second end side, in the axial direction.

* * * * *